(12) United States Patent
Ranta et al.

(10) Patent No.: US 7,292,232 B2
(45) Date of Patent: Nov. 6, 2007

(54) DATA INPUT DEVICES AND METHODS FOR DETECTING MOVEMENT OF A TRACKING SURFACE BY A LASER SPECKLE PATTERN

(75) Inventors: Craig S. Ranta, Redmond, WA (US); John M. Lutian, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 620 days.

(21) Appl. No.: 10/837,052

(22) Filed: Apr. 30, 2004

(65) Prior Publication Data

US 2005/0243055 A1 Nov. 3, 2005

(51) Int. Cl.
*G09G 5/00* (2006.01)
(52) U.S. Cl. ...................... 345/175; 345/157
(58) Field of Classification Search ............. 345/156, 345/157, 166, 175; 250/203.1, 203.2
See application file for complete search history.

(56) References Cited

U.S. PATENT DOCUMENTS

| | | | |
|---|---|---|---|
| 4,364,035 | A | 12/1982 | Kirsch |
| 4,719,455 | A | 1/1988 | Louis |
| 4,794,384 | A | 12/1988 | Jackson |
| 5,274,361 | A | 12/1993 | Snow |
| 5,489,900 | A | 2/1996 | Cali et al. |
| 5,574,480 | A | 11/1996 | Pranger et al. |
| 5,644,139 | A | 7/1997 | Allen et al. |
| 5,694,123 | A | 12/1997 | Selker et al. |

(Continued)

FOREIGN PATENT DOCUMENTS

| | | | |
|---|---|---|---|
| EP | 0295720 | A2 | 12/1988 |
| GB | 2272763 | A | 5/1994 |
| WO | WO 97/43607 | A1 | 11/1997 |

OTHER PUBLICATIONS

Asakura et al., "Dynamic Laser Speckles and Their Application to Velocity Measurements of the Diffuse Object," Applied Physics, 1981, 179-194.

(Continued)

*Primary Examiner*—Amr A. Awad
*Assistant Examiner*—Tom V Sheng
(74) *Attorney, Agent, or Firm*—Senniger Powers

(57) ABSTRACT

A data input device for use with an optically rough tracking surface comprising a substantially coherent light source for projecting a substantially coherent light beam onto the tracking surface for scattering the substantially coherent light beam. An optic guides the projected substantially coherent light beam toward the tracking surface and comprises a first boundary facing the substantially coherent light source and a second boundary opposite the first boundary. A detector detects at least a portion of the scattered light beam comprising a speckle pattern. The optic is arranged such that the tracking surface is spaced from the second boundary by a distance sufficient to inhibit any substantial retro-reflection of the substantially coherent light beam striking the second boundary from striking the detector. A controller responsive to the detector operates the device in a tracking mode for utilizing the detected speckle pattern to track relative movement between the device and the tracking surface. The device is particularly useful in handheld and laptop devices, such as personal digital assistants, cellular phones, laptop computers, etc., where it is desirable to interact with a tracking surface comprising human skin, such as a fingertip.

34 Claims, 6 Drawing Sheets

U.S. PATENT DOCUMENTS

| | | | |
|---|---|---|---|
| 5,712,658 | A | 1/1998 | Arita et al. |
| 5,729,009 | A | 3/1998 | Dändliker et al. |
| 5,793,357 | A | 8/1998 | Ivey et al. |
| 5,907,152 | A | 5/1999 | Dändliker et al. |
| 5,914,783 | A | 6/1999 | Barrus |
| 6,031,218 | A | 2/2000 | Piot et al. |
| 6,057,540 | A | 5/2000 | Gordon et al. |
| 6,246,482 | B1 | 6/2001 | Kinrot et al. |
| 6,256,016 | B1 | 7/2001 | Piot et al. |
| 6,323,839 | B1 | 11/2001 | Fukuda et al. |
| 6,330,057 | B1 | 12/2001 | Lederer et al. |
| 6,331,848 | B1 | 12/2001 | Stove et al. |
| 6,424,407 | B1 | 7/2002 | Kinrot et al. |
| 6,448,977 | B1 | 9/2002 | Braun et al. |
| 6,452,683 | B1 | 9/2002 | Kinrot et al. |
| 6,455,840 | B1 | 9/2002 | Oliver et al. |
| 6,498,604 | B1 | 12/2002 | Jensen |
| 6,531,692 | B1 | 3/2003 | Adan et al. |
| 6,642,506 | B1 | 11/2003 | Nahum et al. |
| 6,707,027 | B2 * | 3/2004 | Liess et al. .................. 250/221 |
| 2002/0145588 | A1 | 10/2002 | McCahon et al. |
| 2003/0102027 | A1 | 6/2003 | Rotzoll |
| 2004/0061680 | A1 | 4/2004 | Taboada |
| 2005/0035947 | A1 | 2/2005 | Lutian |
| 2006/0028442 | A1 * | 2/2006 | Bynum et al. ............... 345/157 |

OTHER PUBLICATIONS

Meyer, "Pen Computing: A Technology Overview and A Vision," ACM SIGCHI Bulletin, Jul. 1995, pp. 46-90, vol. 27, Issue 3, ACM Press, New York, USA.

Ohtsubo et al., "Velocity Measurement of a Diffuse Object by Using Time-Varying Speckles," Optical and Quantum Electronics, 1976, pp. 523-529, Chapman and Hall Ltd., Great Britain.

Optical Mouse Saves Space, The Online Photonics Resource, http://optics.org, Dec. 8, 2003, 2 pp., United States.

Optical Scrolling, The Online Photonics Resource, http://optics.org, Dec. 8, 2003, 1 pg., United States.

Prototype Device, The Online Photonics Resource, http://optics.org, Dec. 8, 2003, 1 pg., United States.

Schnell et al., "Detection of Movement with Laser Speckle Patterns: Statistical Properties," Optical Society of America, Jan. 1998, pp. 207-216, vol. 15, No. 1.

* cited by examiner

DATA INPUT DEVICES AND METHODS FOR DETECTING MOVEMENT OF A TRACKING SURFACE BY A LASER SPECKLE PATTERN

TECHNICAL FIELD

Embodiments of the present invention relate to the field of computer input devices, and particularly data input devices, such as a mouse, trackball, joystick, touch pad, or a touch-sensitive post. In particular, embodiments of this invention relate to data input devices for projecting a substantially coherent light beam onto a tracking surface having light-scattering properties, guiding the substantially coherent light beam toward the tracking surface with an optic, orienting and spacing the tracking surface from the optic by a distance sufficient to inhibit any substantial retro-reflection, detecting laser speckle (i.e., out of phase substantially coherent light) reflected from the tracking surface, and utilizing the detected speckle pattern to track relative movement between the device and the tracking surface.

INCORPORATION BY REFERENCE

The following U.S. patent is hereby fully incorporated by reference: U.S. Pat. No. 6,531,692 B1 issued to Adan et al., entitled "OPTICAL COUPLING ASSEMBLY FOR IMAGE SENSING OPERATOR INPUT DEVICE", and assigned to Microsoft Corporation.

The following U.S. patent application is hereby fully incorporated by reference: U.S. patent application Ser. No. 10/641,672 invented by Lutian, entitled "DATA INPUT DEVICE FOR TRACKING AND DETECTING LIFT-OFF FROM A TRACKING SURFACE BY A REFLECTED LASER SPECKLE PATTERN", and assigned to Microsoft Corporation.

BACKGROUND OF THE INVENTION

Previous computer input devices, such as mice, include rotatable balls mounted within a housing, yet rotatably engaging a surface. As the housing of such a mouse translates across the surface, the ball rotates within the housing, engaging horizontal and vertical wheels that rotate against the ball, thereby indicating horizontal and vertical movement of the mouse across the surface. Building upon these primarily mechanical tracking devices, optical tracking devices have become available. Such devices optically track movement of a surface, rather than mechanically as with the devices described immediately above. These optical systems typically do not require wheels in contact with a movable ball, which may act as a common collection point for dust and dirt. But such devices lack the ability to track on any surface, requiring a suitable frictional interface between the ball and the surface. Moreover, these devices still require one moving part, the ball. In addition, aliasing artifacts may cause the cursor to skip, rather than move fluidly during rapid motion of the device.

Still other optical devices place the pattern on the tracking surface (e.g., a mouse pad), rather than on the rotatable ball, thereby using the mouse pad to generate optical tracking information. Although such devices are able to eliminate the moving ball, they are less universal by requiring a specific tracking surface to operate.

Other more recent optical tracking devices have emerged that have eliminated the need for a patterned ball or mouse pad. One such device utilizes an LED to project light across the tracking surface at a grazing angle to the tracking surface. The mouse then collects tracking information by detecting dark shadows cast by high points in the surface texture, which appear as dark spots. This device eliminates the moving ball of previous devices, and is useful on a variety of surfaces. However, smooth or glossy surfaces may prove difficult to track upon, because they may generate no shadows from texture and present a low contrast image that may not provide adequate features upon which to track.

Other devices have been developed for tracking movement of a tracking surface, wherein the tracking surface is a finger of the user. Such devices are particularly useful in handheld and laptop devices, such as personal digital assistants, cellular phones, laptop computers, as well as any other electronic device where it is desirable to locate a data input device on the device itself, for interaction with a tracking surface comprising human skin, such as a fingertip. For example, some devices include an upwardly extending post mounted on several force sensors. As the user places a finger upon the top of the post and applies pressure in any direction, the resultant forces on the force sensors may be correlated to movement of a cursor, or pointer, on a display. Such systems suffer from several drawbacks. For example, such systems do not track the actual location information relating to the location of the user's moving hand and finger with respect to the device, but instead merely rely upon merely directional information to indicate the direction of cursor movement on the display and force information to indicate the proportional speed of cursor movement on the display. In other words, while maintaining a fingertip in one position, the user increases pressure on the post in a particular lateral direction to move the cursor. These systems may be difficult to use for some users because they function solely on direction and force information, rather than position information, as is typical with a standard mouse, with which most users are accustomed and may find more intuitive. In addition, such systems may suffer from cursor drift, wherein no finger engages the post, but one or more of the force sensors incorrectly senses a pressure. The cursor then drifts across the display, rather than maintaining its position, without any finger pressure applied to the post. Cursor drift is undesirable because the cursor moves across the display, without direction by the user.

SUMMARY OF THE INVENTION

Accordingly, a data input device for use with a tracking surface—the device including a substantially coherent light source for projecting a substantially coherent light beam and an optic for altering a wavefront profile of a light beam scattered from a tracking surface so that the collected scattered light beam has a substantially constant phase relative to the plane of the detector, such that the detector detects a substantially stable speckle pattern from the collected scattered light beam—is desired to address one or more of these and other disadvantages. For example, such a device may be well-suited for replacement of an upwardly extending post or touch pad, generally as set forth above.

In accordance with one aspect of the invention, a data input device for use with a tracking surface having light-scattering properties comprises a substantially coherent light source for projecting a substantially coherent light beam onto the tracking surface during operation. The tracking surface scatters the substantially coherent light beam striking the tracking surface. An optic guides the projected substantially coherent light beam toward the tracking surface, and the tracking surface scatters the substantially coherent light beam when the substantially coherent light beam strikes the tracking surface. The optic comprises a first boundary facing the substantially coherent light source and a second boundary opposite the first boundary and configured to face the tracking surface. A detector associated with the substantially coherent light source detects at least a portion of the substantially coherent light beam scattered by the tracking surface. The detected portion comprises a speckle pattern. The optic is arranged between the detector and the tracking surface during operation such that the tracking surface is spaced from the second boundary by a distance sufficient to inhibit any substantial retro-reflection of the substantially coherent light beam striking the second boundary from striking the detector. A controller responsive to the detector operates the device in a tracking mode by utilizing the detected speckle pattern to track relative movement between the device and the tracking surface.

In accordance with another aspect of the present invention, a data input device for use with a tracking surface having light-scattering properties comprises a substantially coherent light source generally as set forth above. A detector associated with the substantially coherent light source defines a plane for detecting scattered substantially coherent light. An optic collects at least a portion of the substantially coherent light beam scattered by the tracking surface and alters a wavefront profile of the collected scattered light beam so that the collected scattered light beam has a substantially constant phase relative to the plane of the detector, such that the detector detects a substantially stable speckle pattern from the collected scattered light beam.

In accordance with still another aspect of the present invention, a method comprises projecting a substantially coherent light beam from a data input device onto a tracking surface having light-scattering properties. The tracking surface scatters the substantially coherent light beam when the substantially coherent light beam strikes the tracking surface. The method guides the substantially coherent light beam toward the tracking surface with an optic and spaces the tracking surface from the optic by a distance sufficient to inhibit any substantial retro-reflection of the substantially coherent light beam striking optic from striking the detector. The method further detects out-of-phase substantially coherent light reflected from the tracking surface as a speckle pattern and utilizes the detected speckle pattern to track relative movement between the device and the tracking surface.

In accordance with yet another aspect of the present invention, a method comprising projecting and scattering a substantially coherent light beam generally as set forth above. The method further collects at least a portion of the substantially coherent light beam scattered by the tracking surface and alters a wavefront profile of the collected scattered light beam so that the collected scattered light beam has a substantially constant phase relative to a plane of a detector. The method further detects a substantially stable speckle pattern from the collected scattered light beam and utilizes the detected speckle pattern to track relative movement between the device and the tracking surface.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
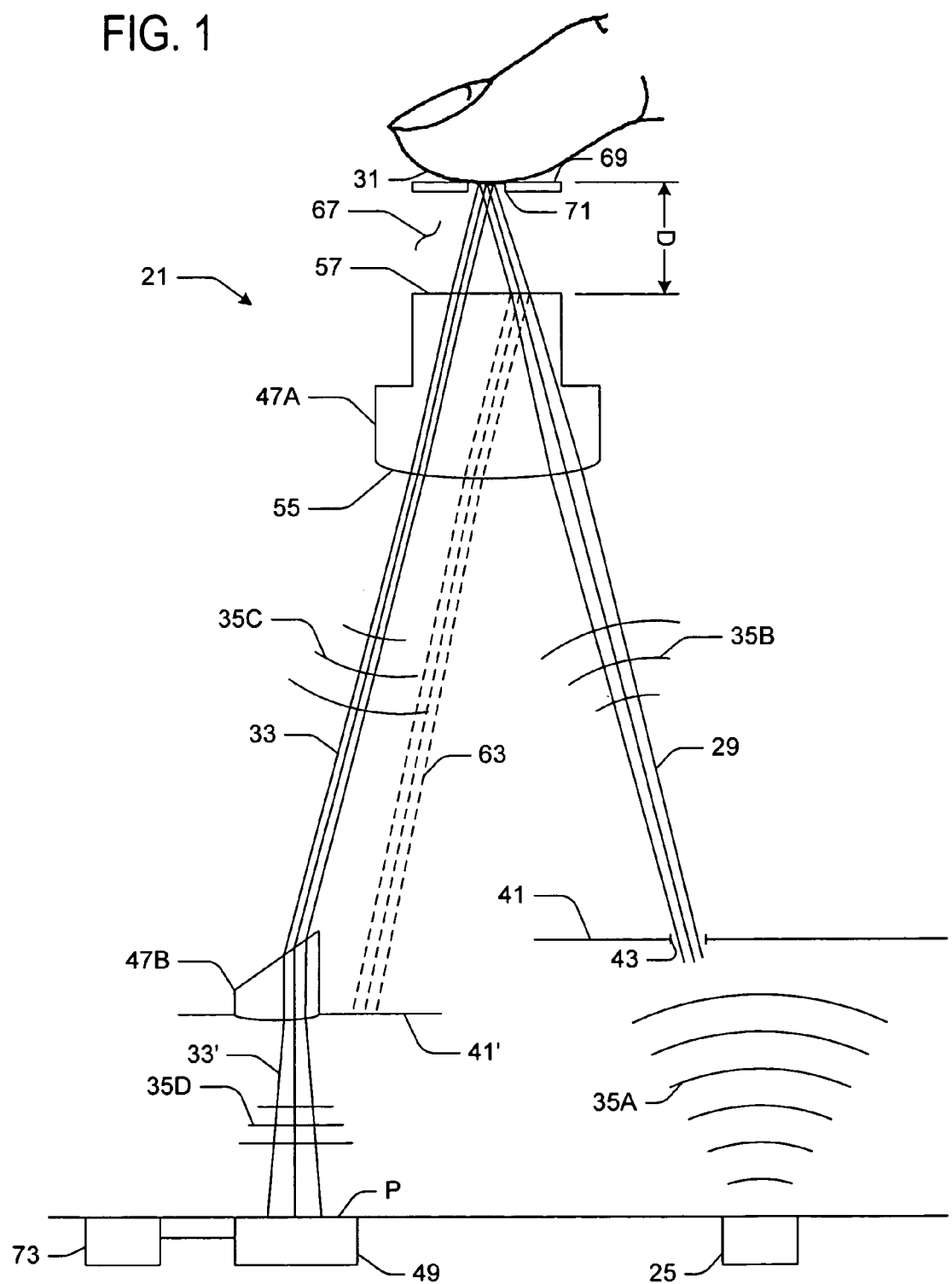
FIG. 1 is a schematic of a data input device of the present invention contacting a tracking surface.
Figure 1A:
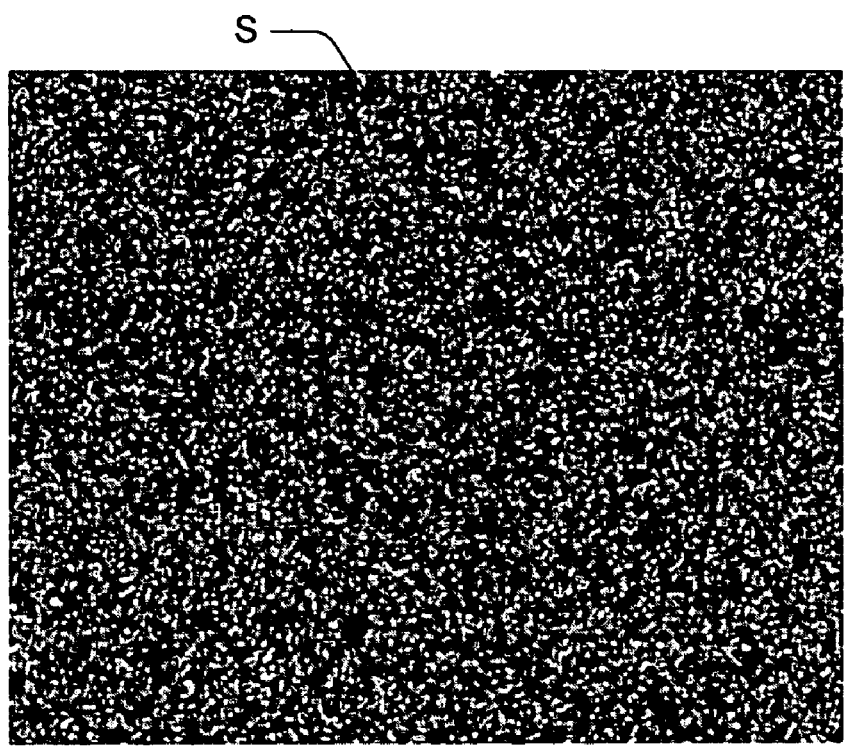
FIG. 1A is an image of a speckle pattern.

In one embodiment, the invention includes a data input device for use with a tracking surface that is optically rough, or in other words, has light-scattering properties, to track relative movement between the device and the tracking surface. FIG. 1 is a schematic of such a data input device and tracking surface of the present invention. The data input device, generally indicated 21, includes a substantially coherent light source 25 (e.g., a laser) for projecting a substantially coherent light beam, generally indicated 29. The substantially coherent light beam projects onto a tracking surface 31 during operation of the device 21. The tracking surface 31 scatters the substantially coherent light beam 29 striking the tracking surface as a scattered light beam 33, as will be discussed in greater detail below. Because the tracking surface 31 has light scattering properties, the substantially coherent light scattered from the tracking surface produces a speckle pattern S (e.g., FIG. 1A). For example, paper, wood, metal, fabric, plastic and human skin each generally have sufficient surface variation to scatter a speckle pattern S. Only surfaces that are perfectly reflective, such as a ground and polished, optic-quality, flat, transparent glass, are insufficiently rough to create a speckle pattern S. Therefore, when the substantially coherent light source 25 projects the substantially coherent light beam 29 (e.g., a laser beam) onto the tracking surface 31, the light-scattering properties of the tracking surface are sufficient to scatter a speckle pattern S. Speckle patterns created when substantially coherent light strikes diffuse surfaces are well known in the art, and their origin and theory will not be reviewed in detail here.

As depicted in FIG. 1, the substantially coherent light source 25 is modeled as a point source, such that a wavefront profile 35A of the substantially coherent light beam 29 is substantially curved. Wavefront profile 35 is defined herein as any constant phase profile passing through the substantially coherent light beam 29. An infinite number of such wavefront profiles 35 exist along the substantially coherent light beam 29, but typically such wavefront profiles are not planar. Thus, when such wavefront profiles 35 strike a flat surface, the light arriving at any single instant over the surface is typically out-of-phase. For example, the wavefront profile 35A depicted in FIG. 1 is curved, demonstrating that the substantially coherent light leaving the substantially coherent light source 25 does not have a planar wavefront profile. Without an appropriate optic, as will be explained below, the shortest path length from the substantially coherent light source 25 to any flat surface is along the normal line between the two, while all other non-normal, substantially coherent light arrive at the flat surface out-of-phase and at some later time, proportional to radial position. Optics may correct this out-of-phase condition, such that at least one wavefront profile is substantially planar. It is desirable to place such a planar wavefront profile at the plane P of the detector 49 so that the scattered substantially coherent light arrives at the detector substantially in-phase. A number of different types of optics are capable of altering the substantially coherent light beam in this manner, as would be readily understood by those skilled in the art.

As discussed in more detail below, optics alter the shape of the wavefront profile as the light passes through the device 21. Before any alteration of the wavefront profile 35, however, the substantially coherent light beam 29 first passes through a field stop 41 as it travels toward the tracking surface 31. This field stop 41 includes an opening 43 for defining the shape of the substantially coherent light beam 29 projected toward the tracking surface. This field stop 41 and substantially coherent light beam 29 combination is particularly useful if the substantially coherent light source 25 does not project a narrow beam, as may be the case with relatively inexpensive sources of substantially coherent light. Instead, the field stop 41 can readily define the width and direction of the projected substantially coherent light beam 29. It should be noted here that after the substantially coherent light beam 29 passes through the field stop 41, the wavefront profile 35B of the beam remains substantially curved, as depicted in FIG. 1. In one example, the substantially coherent light source 25 is a vertical cavity surface emitting laser (VCSEL) having a small aperture size, such as 10 to 20 microns (0.39 to 0.79 mils (milliinches)). The wavefront profile 35 of the substantially coherent light beam 29 produced by such a VCSEL may be modeled as a spherical wave emanating from a point source. It should also be understood by one skilled in the art that a greater or fewer number of field stops 41 for altering the shape of the substantially coherent light beam 29 may be utilized without departing from the scope of the claimed invention. In particular, where the substantially coherent light source 25 projects an appropriately shaped substantially coherent light beam 29 for the device, no field stop 41 is needed.

In order to control the wavefront profile 35 and other aspects of the substantially coherent light beam 29 and the scattered light beam 33, the device 21 further comprises multiple optics 47 for guiding the projected substantially coherent light beam toward the tracking surface 31 and the scattered light beam toward a detector 49 associated with the substantially coherent light source 25. The detector 49 is adapted to detect at least a portion of the substantially coherent light beam 29 scattered by the tracking surface 31 as the scattered light beam 33, the detected portion comprising the speckle pattern S. The detector 49 further defines a plane P for detecting the scattered light beam 33, as will be discussed in greater detail below.

In the embodiment depicted in FIG. 1, two optics 47 are utilized to control the substantially coherent light beam 29 and the scattered light beam 33. The two optics 47 include a first optic 47A arranged between the tracking surface 31 and both the detector 49 and the substantially coherent light source 25, and a second optic 47B arranged between the detector and the first optic, as will be discussed in greater detail below. The first optic 47A comprises a first boundary 55 facing the substantially coherent light source 25 and the detector 49, and a second boundary 57 opposite the first boundary and configured to face the tracking surface 31. As depicted in FIG. 1, the first boundary 55 is convex, such that the substantially coherent light beam 29 converges slightly as it passes through the first boundary. The second boundary 57 is substantially flat, such that the substantially coherent light beam 29 neither converges nor diverges as it passes through the second boundary. (It is also contemplated that the second boundary 57 may have a curvature, without departing from the scope of the present invention.) But a retro-reflection 63 of the substantially coherent light beam 29 does reflect from the second boundary 57 and in the general direction of the detector 49. Because this retro-reflection 63 is not indicative of movement of the tracking surface 31 relative to the device 21, it is effectively noise, thereby degrading the signal-to-noise ratio of the signal, and therefore its detection by the detector 49 should be avoided.

To avoid detection of the retro-reflection 63, instead of the true reflection, or scattering, from the tracking surface 31, the tracking surface may be spaced from the second boundary 57 by a distance D sufficient to inhibit any substantial retro-reflection of the substantially coherent light beam 29 striking the first boundary 55 from striking the detector 49. As depicted in FIG. 1, the retro-reflection 63 is offset, or laterally sheared, from the scattered light beam 33, such that the optics 47 and detector 49 of the device 21 may be positioned to avoid detecting the retro-reflection. As would be readily understood by one skilled in the art, as distance D increases, the offset between the retro-reflection 63 and the scattered light beam 33 also increases. In one example, the spaced-apart distance D is at least about 2 millimeters (mm) (0.08 inch). In another example, the spaced-apart distance is at least about 7 mm (0.3 inch). One benefit of inhibiting detection of the retro-reflection 63 by controlling the position of the tracking surface 31 with respect to the optic 47A is that the optic may be an uncoated optic, which significantly reduces the cost of such an optic. It should be understood by those skilled in the art that coated optics may also be used without departing from the scope of the present invention. Utilizing such coated optics may reduce the need to separate the optic from the tracking surface, although some separation is likely required for protection of the optic from repeated contact with the tracking surface. An additional retro-reflection (not shown) of the substantially coherent light beam 29 reflects from the first boundary 55 in the general direction of the detector 49. However, because the first boundary 55 is spaced further from the tracking surface 31 than the second boundary 57, the retro-reflection is further offset, or laterally sheared, from the scattered light beam 33.

In order to maintain an appropriate spaced-apart distance D, the device 21 may further comprise a spacing medium 67 adjacent the second boundary 57 of the optic 47A adapted to maintain the spaced-apart distance between the second boundary and the tracking surface 31. In particular, the spacing medium 67 may be an air space maintained by a support surface 69 having an opening 71 therein and engageable with the tracking surface 31 for maintaining the appropriate spacing between the tracking surface and the optic 47A, while allowing the substantially coherent light beam 29 to strike the tracking surface. Where the tracking surface 31 is human skin, as depicted in FIG. 1, the spacing medium 67 ensures the appropriate spacing for inhibiting the retro-reflection 63 from striking the detector 49, while facilitating accurate position determination of the tracking surface by positioning the user's finger at the appropriate position relative the first optic 47A. The substantially coherent light beam 29 passes through the air space of the spacing medium 67 and the opening 71 in the support surface 69 to project onto the tracking surface 31, here a fingertip of the user. The tracking surface 31 scatters the substantially coherent light beam 29, thereby creating the scattered light beam 33 noted above. As depicted in FIG. 1, the wavefront profile 35C of the scattered light beam 33 remains curved, such that direct detection of the scattered light beam, without further optical manipulation, would not provide a substantially stable speckle pattern S, as will be described in detail below. In another example, the spacing medium 67 is a transparent material, such as glass or plastic.

In order to manipulate the scattered light beam 33 to provide a substantially stable speckle pattern S at the plane P of the detector 49, the second optic 47B collects at least a portion of the scattered light beam and alters the wavefront profile 35D of the collected scattered light beam 33 so that after manipulation, the collected scattered light beam 33' has a substantially constant phase relative to the plane of the detector. This substantially constant phase of the wavefront profile 35D ensures that the detector 49 detects a substantially stable speckle pattern S from the collected scattered light beam 33'. In addition to the second optic 47B, in the example depicted in FIG. 1, the device 21 also comprises another field stop 41' associated with the second optic for limiting the ability of the retro-reflection to strike the second optic or the detector 49. As would be understood by one skilled in the art, the substantially coherent light source 25 and detector 49 may be arranged nearer one another, such that the second optic 47B may be a rotationally symmetric, rather than prismatic, as depicted in FIG. 1. For example, the substantially coherent light source 25 and detector 49 may be arranged with a center-to-center spacing of about 2 mm (0.08 inch), such that the second optic 47B may be replaced with a plano convex optic.

The device 21 further comprises a controller, or tracking engine, 73 responsive to the detector 49 for operating the device in a tracking mode by utilizing the detected speckle pattern S to track relative movement between the device and the tracking surface 31. The speckle pattern S is useful for tracking because as the substantially coherent light beam 29 and tracking surface move relative to one another, the spatial relationships of the speckle grains in the speckle pattern are maintained as the speckle image translates across the detector 49, enabling a strong correlation to a reference image, or previous speckle image, in the tracking engine. The stable speckle pattern S allows the tracking engine 73 to follow its path across the detector 49, thereby indicating relative movement between the device 21 and the tracking surface 31. Transient speckle grains are not suitable for tracking because they may disappear and reappear as the device 21 and tracking surface 31 move relative to one another, reducing the correlation strength relative to the reference image of the tracking engine 73. A substantially stable speckle pattern S is characterized by a substantial portion of stable speckle grains upon which relative movement of the device 21 and the tracking surface 31 may be tracked. Correlation and phase-based tracking engines 73 depend upon a sequence of stable images to correctly identify tracking motion. Degradation or distortion of tracking input images relative to a reference image severely impairs accurate functioning of correlation and phase-based tracking engines 73. A substantially stable speckle pattern S improves functioning of tracking engines 73 because it provides a reliable image by which relative movement of the device 21 and tracking surface 31 may be tracked. On the other hand, a speckle pattern S exhibiting speckle grains that are not substantially stable is characterized as boiling and is typically caused because the substantially coherent light beam 29 striking the tracking surface 31 has a changing phase profile over the extent of the beam, leading to substantial phase distortion. Techniques for minimizing speckle pattern S boiling will be discussed in greater detail below. Other types of tracking engines, beyond correlation tracking engines and phase-based tracking engines, are also contemplated as within the scope of the present invention.

In any event, tracking relative movement between the device 21 and the tracking surface 31 using the scattered speckle pattern S, rather than a pattern fixed on a tracking surface 31 (e.g., a fingerprint), offers several advantages. First, virtually any surface may be used as a tracking surface 31. Second, particular substantially coherent light sources 25, such as lasers (e.g., semiconductor VCSELs), draw very little power and may be used in battery-operated devices, such as laptops and handheld electronic devices, which must operate efficiently. Third, utilizing a speckle pattern S as the tracking indicia eliminates the need for a patterned surface having a particular resolution, such as a patterned ball or a patterned mouse pad, as was practiced in the prior art.

The third feature is particularly useful when the tracking surface 31 is human skin, as depicted in FIG. 1. Although it is possible to utilize the surface features of a human finger, such as those forming a fingerprint, as a tracking pattern, the maximum resolution available from such a system is limited to about 500 dots per inch (dpi). This resolution limit is brought about due to the inherent size of fingerprint features, which are too large to provide precise tracking above about 500 dpi. Because a human finger is only about 15 mm (0.59 inch) wide, a user utilizing a device having a resolution of 500 dpi would need to repeatedly translate and pick up the tracking finger (i.e., clutching) to move a cursor completely across a display, where each dot of resolution in a particular direction corresponds to a single pixel of the display in the same direction. For example, for a display having 1024 horizontal pixels and a finger width of 15 mm (0.59 inch), between three and four clutches would be required to move the cursor across the entire display. If desired to alleviate such clutching, the response to relative movement of the tracking surface 31 and device 21 may be magnified by a factor, such as four, but such a magnification factor also induces a subsequent loss in precision, whereby only every fourth pixel on the display may be selected by the user.

In contrast, tracking based upon laser speckle, rather than surface features of the tracking surface 31, dramatically increases the potential tracking resolution. For example, a typical mechanical mouse tracks at approximately 500 dpi, such that about 51 mm (2.0 inches) of travel is required for traversing a 1024 pixel display, assuming one dot per pixel, or maximum precision. As noted above, a single human finger is insufficiently wide to traverse a 1024 pixel display at 500 dpi resolution without clutching. The tracking resolution for movement between the tracking surface 31 and the device 21 increases in one example to at least about 1000 dpi, and in another example to at least about 2000 dpi, which is suitable for a finger tracking device. In particular, at the 1000 dpi resolution, a user can translate a 1024 pixel display with less than two full passes of a single finger. Moreover, at the 2000 dpi resolution, a user can translate a 1024 pixel display within the width of a single finger. A device 21 having such a resolution is desirable because the user need not perform any clutching to transverse the entire width of the display. In other words, the user can manipulate the cursor about the entire display, without lifting the tracking finger from the device 21. Thus, finger tracking utilizing a substantially coherent light source 25 and a speckle pattern S provides several advantages over traditional surface feature tracking.

One such suitable laser (substantially coherent light source 25) for use with the present invention is a VCSEL, as noted above. Although any type of laser 25 may be used, a VCSEL has the distinct advantage drawing less than about 10 mW (13 μhorsepower) of power, and having a maximum optical output power of 1 mW (1.3 μhorsepower). In addition, VCSELs are relatively small in size, easing packaging considerations, and are relatively inexpensive to manufacture, easing cost considerations. Moreover, maintaining the power of the laser at a relatively low level ensures that the laser does not present an eye hazard for the user. Other lasers and sources of substantially coherent light may also be utilized without departing from the scope of the claimed invention. For example, the substantially coherent light source may project an infrared, substantially coherent light beam, which is beneficial because VCSELs may be readily manufactured at this wavelength and may be less expensive than visible sources. In addition to limiting the power of the substantially coherent light source, in one example, it may also project a substantially coherent light beam having a substantially unitary polarization, which may help generate a single speckle field and additional speckle pattern stability. (It should be understood by one skilled in the art, however, that multimode substantially coherent light sources (e.g., a multimode VCSELs), which alternate polarization states between several modes and orthogonal directions, may also be used without departing from the scope of the present invention.

The detector 49 of the device 21 detects the speckle pattern S scattered by the tracking surface 31 and images the detected speckle pattern. Any detector 49 capable of imaging the speckle pattern S may be utilized with the present embodiment. Such detectors 49 may include photodetectors, CCDs (charge-coupled devices), CMOS (complementary metal-oxide semiconductor) technology or other detector arrays. The detector 49 detects the dark and light pattern generated by the speckle pattern S and sends information corresponding to this detected speckle grain to the controller 73, which is responsive to the detector. The controller 73 then utilizes the speckle pattern S to track the relative movement between the device 21 and the tracking surface 31. Tracking engines 73 utilizing pattern detection to correlate a moving pattern as well as other tracking methods are well known in the art and will not be described in detail here. More importantly, tracking relative movement between the device 21 and the tracking surface 31 by detecting movement of the speckle pattern S is only feasible when the speckle pattern is substantially stable. A substantially stable speckle pattern S should produce speckle grains that are substantially stationary with respect to the tracking surface 31 and substantially constant in brightness, acting as tracking indicia on what may be an unmarked tracking surface. With substantially stable speckle grains, the detector 49 and controller 73 can work together to track the movement of such grains, thereby tracking relative movement between the device 21 and any optically rough tracking surface 31. One skilled in the art would readily understand how to utilize a detector 49 and a tracking engine 73 to utilize the movement of a substantially stable pattern S, here the substantially stable speckle grains, across the detector with relative movement between the device 21 and the tracking surface 31.

Although not the focus of the present invention, the controller 73 is also responsive to the detector 49 for suspending tracking of relative movement between the device and the tracking surface when the detector detects an off-surface condition, such as due to speckle boiling, as described in co-pending U.S. application Ser. No. 10/641, 672 (noted above), commonly assigned to Microsoft Corporation. The details of such application are incorporated by reference herein.

Figure 2:
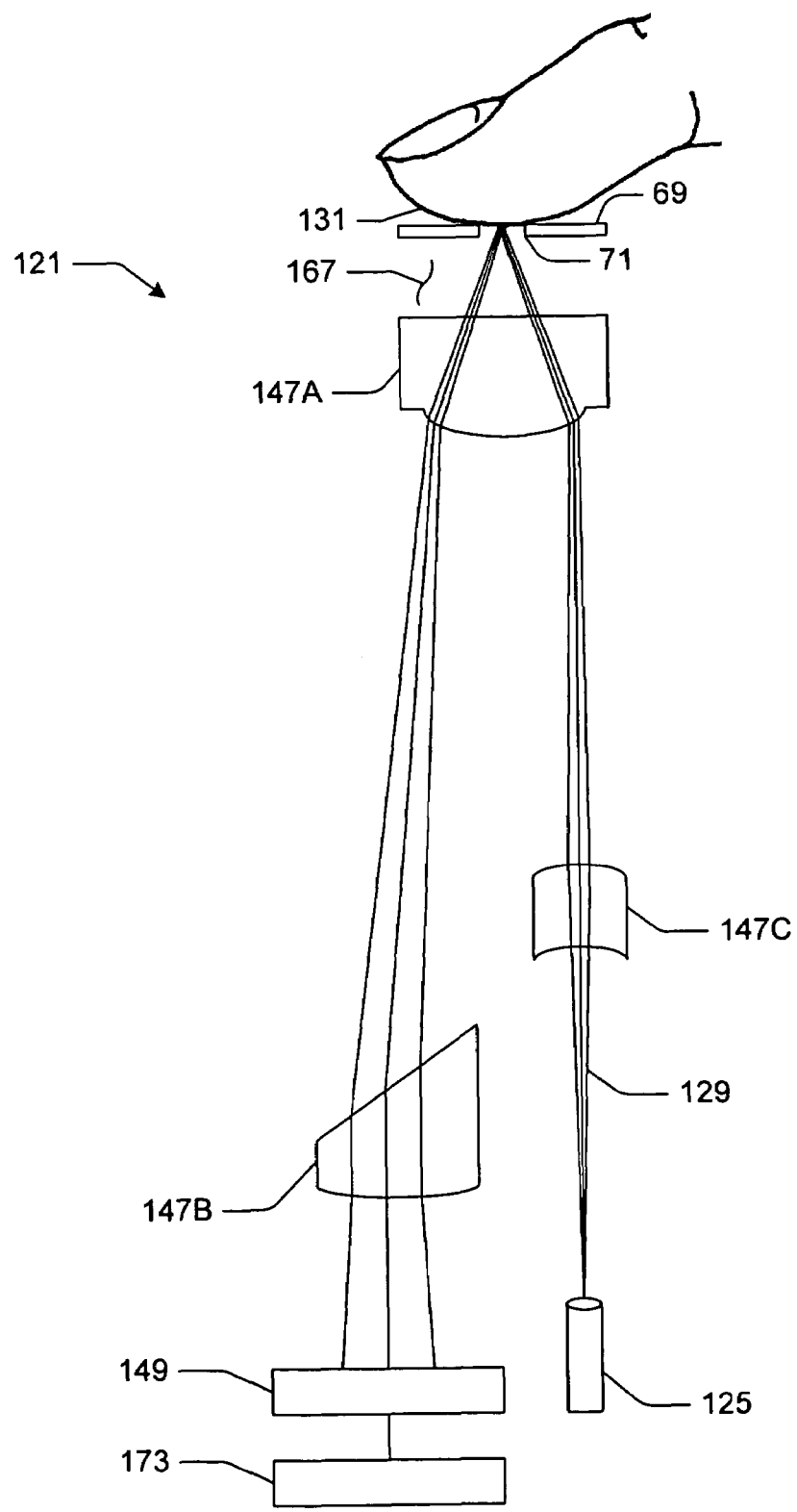
FIG. 2 is a schematic of another embodiment of the data input device of the present invention.

Referring now to FIG. 2, yet another example of the device of the present invention is depicted. In particular, the device 121 comprises a substantially coherent light source 125 projecting a substantially coherent light beam 129 and a first optic 147A arranged between the tracking surface 31 and both a detector 149 and the substantially coherent light source 125, and a second optic 147B arranged between the detector and the first optic, generally as set forth above. In addition, the device 121 comprises a third optic 147C (such as a collimator) for further control over the wavefront profile of the substantially coherent light beam 129. The device 121 further comprises a spacing medium 167 for inhibiting retro-reflection from interfering with tracking and a controller 173 for tracking relative movement between the device 121 and a tracking surface 131, generally as set forth above. The difference, between the device configurations of FIGS. 1 and 2, is the addition of the third, collimating optic 147C to device 121, which eliminates the need for the field stop 41 as depicted in the device 21 of FIG. 1

Figure 3:
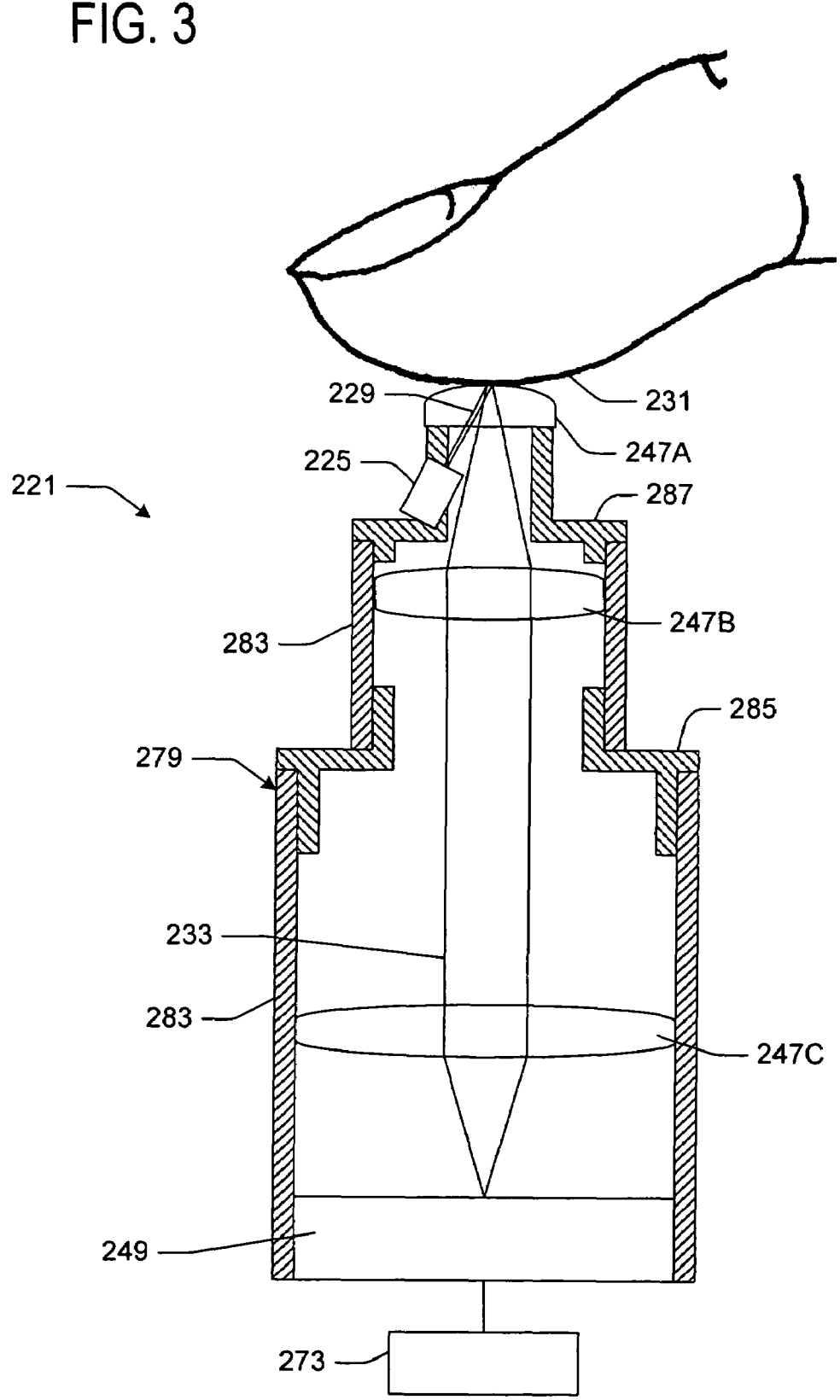
FIG. 3 is a cross section of still another embodiment of the data input device of the present invention.

Turning now to FIG. 3, still another example of the device of the present invention is depicted. As with the previous examples, the device 221 comprises a substantially coherent light source 225 for projecting a substantially coherent light beam 229, a first optic 247A adapted for contact with a tracking surface 231 for scattering the substantially coherent light, second and third optics 247B,247C for guiding a scattered light beam 233 toward a detector 249, and a controller 273 associated with the detector for tracking relative movement between the device and the tracking surface, generally as set forth above. In addition, the substantially coherent light source 225 includes a collimating lens (not shown) for collimating the substantially coherent light beam 229 adjacent the substantially coherent light source (i.e., before the beam reaches the first optic 247A). For example, the substantially coherent light source 225 may comprise a VCSEL (as generally described above) and an integral collimating lens, such as a 2 mm (0.08 inch) diameter, plano-convex lens sold as the OptoSigma Model No. 011-007 available from OptoSigma Corporation of Santa Ana, Calif. In addition, in the example shown, the second and third optics 247B,247C may be a bi-convex, aspherical lenses. The second optic 247B may be arranged at a distance from the first optic 247A equivalent to its focal length. Similarly, the third optic 247C may be arranged at a distance from the detector 249 equivalent to its focal length. Moreover, the second optic 247B and third optic 247C may be positioned for back-to-back, infinite focus with respect to one another. This arrangement positions the focal plane of the detector 249 at one focal length from the third optic 247C, which focuses the speckle image at infinity, thereby presenting a collimated input to the detector. This arrangement is beneficial for controlling the scattered light beam 233 to exhibit a wavefront profile at the detector 249 having a substantially constant phase, so that the detector may detect a substantially stable speckle pattern S.

The device 221 also comprises a housing, generally indicated 279. The housing depicted is formed from several portions, including two cylindrical sections 283, a joint 285 connecting the cylindrical sections, and an upper housing 287 extending upward from the uppermost cylindrical section. The first optic 247A and the substantially coherent light source 225 mount on an upper end of the upper housing 287. The second optic 247B is received within the uppermost cylindrical section 283, while the third optic 247C is received within the lowermost cylindrical section. The detector 249 mounts within the lowermost cylindrical section 283, beneath the third optic 247C. As shown, the housing 279 receives the optics 247 and detector 249, and the housing may take any number of shapes without departing from the scope of the claimed invention.

In the embodiments described above, particular optics are depicted, for example bi-convex and plano-convex, aspherical lens. As would be readily understood by one skilled in the art, other optics, such as those including more than one lens, non-aspherical lenses and other types of lenses altogether are also contemplated as within the scope of the claimed invention.

Figure 4:
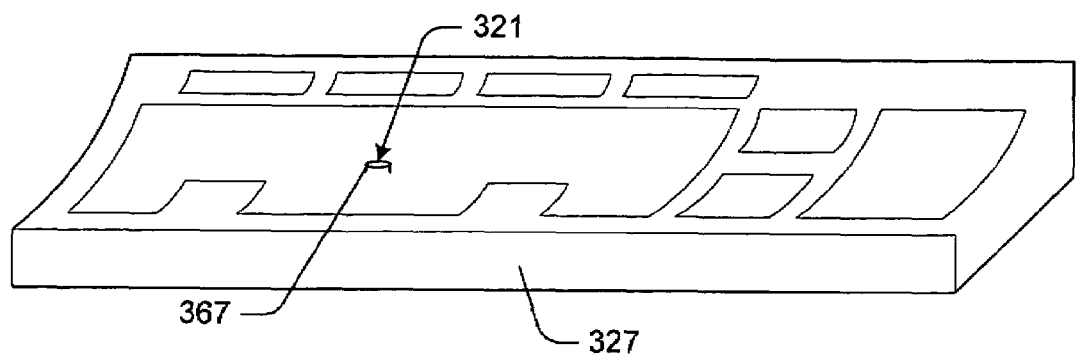
FIG. 4 is a schematic of the data input device of the present invention adapted for use with a keyboard.
Figure 5:
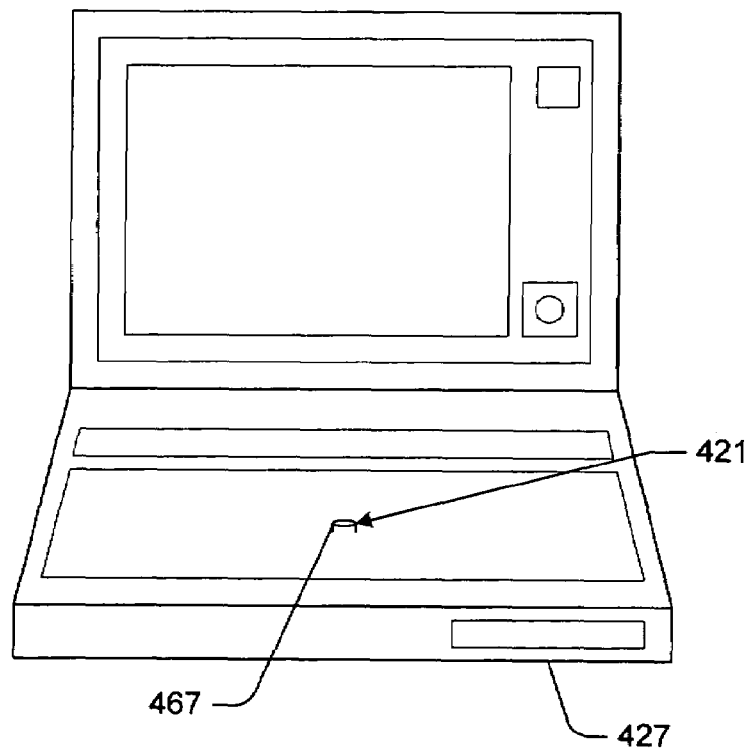
FIG. 5 is a schematic of the data input device of the present invention adapted for use with a laptop computer.

The devices of the present invention may be used as a data input devices for pointing with virtually any device or apparatus. FIGS. 4 and 5 depict two examples where a data input device of the claimed invention would be particularly useful. FIG. 4 depicts a device of the present invention, generally indicated 321, integral with a keyboard 327, having a spacing medium 367 of the device also integral with the keyboard, such that as the user utilizes the keyboard, the user may also manipulate the device to alter the location of a pointer on a display associated with the keyboard. In particular, the spacing medium 367 may be positioned adjacent a home position of a typing finger of the keyboard 327 for ease of access to the spacing medium by a typing finger. Similarly, FIG. 5 depicts a device of the present invention, generally indicated 421, integral with a laptop computer 437, having a spacing medium 467 of the device also integral with the laptop computer, such that as the user utilizes the laptop computer, the user may also manipulate the device to alter the location of a pointer on the display of the laptop computer. Such devices are also particularly useful in handheld devices, such as personal digital assistants, cellular phones, as well as any other electronic device where it is desirable to locate a data input device on the device itself, for interaction with a tracking surface comprising human skin, such as a fingertip.

Figure 6:
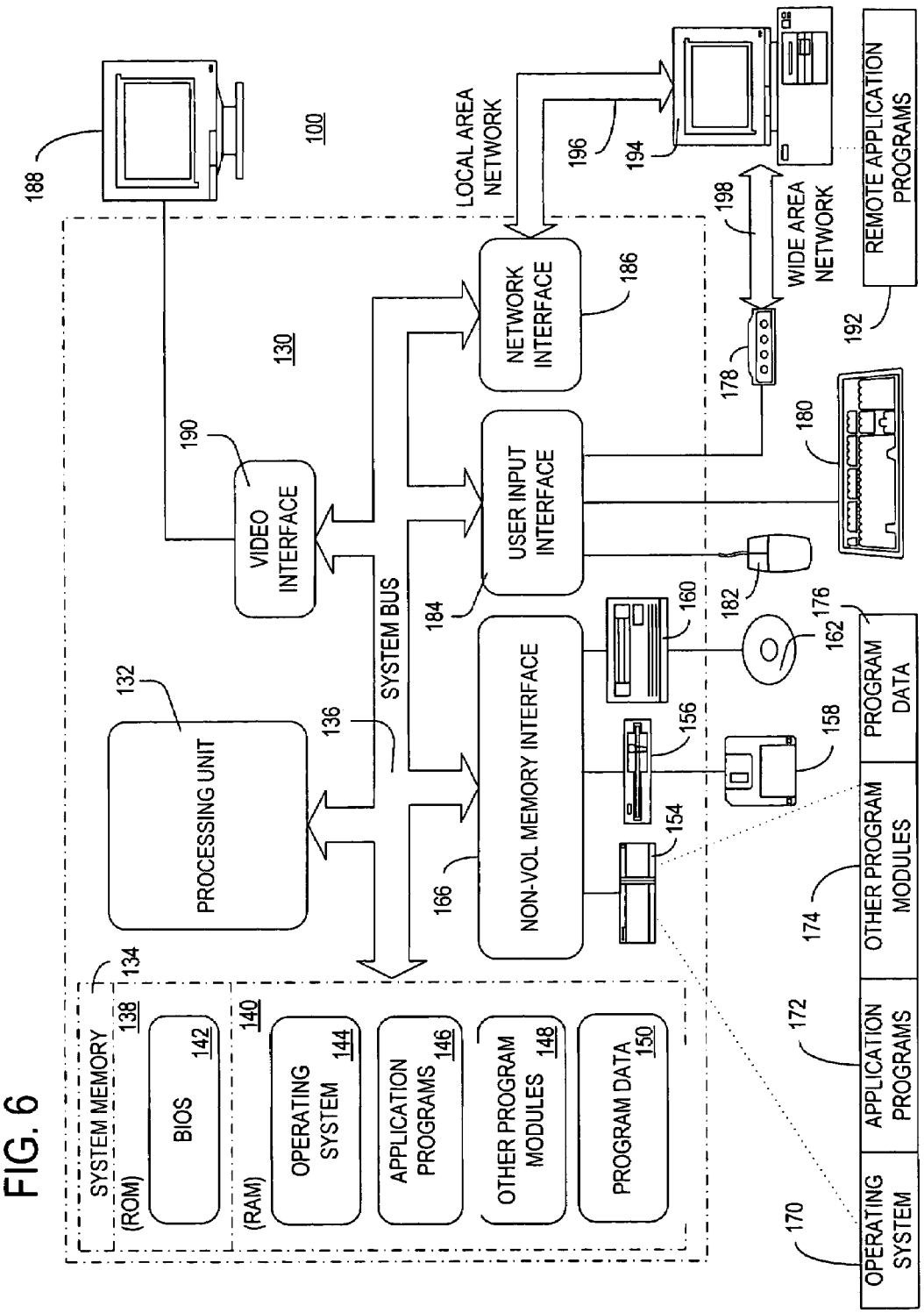
FIG. 6 is a block diagram illustrating one example of a suitable computing system environment in which the invention may be implemented.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182

(e.g., a mouse, trackball, pen, or touch pad). Other input devices (not shown) may include a microphone, joystick, game pad, camera, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the operations described below in conjunction with a microprocessor or other data processor.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A data input device for use with a tracking surface, said tracking surface having light-scattering properties, said device comprising:

a substantially coherent light source for projecting a substantially coherent light beam onto said tracking surface during operation, said tracking surface scattering the substantially coherent light beam striking said tracking surface;

an optic for guiding the projected substantially coherent light beam toward the tracking surface, said tracking surface scattering the substantially coherent light beam when the substantially coherent light beam strikes the tracking surface, said optic comprising, a first boundary facing said substantially coherent light source, and a second boundary opposite the first boundary and configured to face said tracking surface;

a detector associated with the substantially coherent light source for detecting at least a portion of the substantially coherent light beam scattered by the tracking surface, said detected portion comprising a speckle pattern; said optic being arranged between the detector and the tracking surface during operation such that the tracking surface is spaced from the second boundary by a distance sufficient to inhibit any substantial retro-reflection of the substantially coherent light beam striking the second boundary from striking the detector; and a controller responsive to the detector for operating the device in a tracking mode by utilizing the detected speckle pattern to track relative movement between the device and the tracking surface.

2. The data input device as set forth in claim 1 further comprising a spacing medium adjacent said second boundary of said optic adapted to maintain a spaced-apart distance between said second boundary and said tracking surface.

3. The data input device as set forth in claim 2 wherein said spaced-apart distance is at least about 2 millimeters (mm) (0.08 inch).

4. The data input device as set forth in claim 3 wherein said spaced-apart distance is at least about 7 mm (0.3 inch).

5. The data input device as set forth in claim 2 wherein said spacing medium is adapted to contact said tracking surface.

6. The data input device as set forth in claim 5 wherein said device is integral with a keyboard.

7. The data input device as set forth in claim 6 wherein said spacing medium is positioned adjacent a home position of a typing finger of the keyboard for ease of access to the spacing medium by said typing finger.

8. The data input device as set forth in claim 5 wherein said spacing medium is an air space.

9. The data input device as set forth in claim 8 further comprising a support surface engageable with said tracking surface for maintaining the appropriate spacing between the tracking surface and the optic and having an opening therein for allowing the substantially coherent light beam to strike the tracking surface.

10. The data input device as set forth in claim 1 wherein said tracking surface is human skin.

11. The data input device as set forth in claim 1 wherein said optic is an uncoated optic.

12. The data input device as set forth in claim 1 wherein said first boundary faces said detector.

13. The data input device as set forth in claim 1 wherein said substantially coherent light source projects an infrared substantially coherent light beam.

14. The data input device as set forth in claim 1 wherein said controller is capable of tracking relative movement between said tracking surface and said device with a resolution of at least about 1000 dots per inch (dpi).

15. The data input device as set forth in claim 14 wherein said controller is capable of tracking relative movement between said tracking surface and said device with a resolution of at least about 2000 dpi.

16. The data input device as set forth in claim 1 wherein said substantially coherent light source is at least one of a single mode Vertical Cavity Surface-Emitting Laser (VCSEL) and a multimode VCSEL.

17. The data input device as set forth in claim 1 wherein said substantially coherent light source projects a substantially coherent light beam having a substantially unitary polarization.

18. The data input device as set forth in claim 1 further comprising a second optic for collecting at least a portion of the scattered light beam and altering a wavefront profile of the collected scattered light beam so that the collected scattered light beam has a substantially constant phase relative to the plane of the detector, such that the detector detects a substantially stable speckle pattern from the collected scattered light beam.

19. The data input device as set forth in claim 18 further comprising a field stop associated with said scattered light beam for defining a shape of the scattered light beam striking the second optic.

20. The data input device as set forth in claim 1 further comprising a field stop associated with said substantially coherent light source for defining the shape of the substantially coherent light beam.

21. The data input device as set forth in claim 1 wherein said controller initiates a non-tracking mode in which said controller is configured to respond to the detected speckle pattern and operate the device in one of a tracking mode and a non-tracking mode depending upon a characteristic of the detected speckle pattern as determined by said controller.

22. A data input device for use with a tracking surface, said tracking surface having light-scattering properties, said device comprising:
 a substantially coherent light source for projecting a substantially coherent light beam onto said tracking surface during operation, said tracking surface scattering the substantially coherent light beam striking said tracking surface;
 a detector associated with the substantially coherent light source, said detector defining a plane for detecting scattered substantially coherent light;
 a first optic comprising a first boundary facing said substantially coherent light source, said first optic further comprising a second boundary opposite the first boundary, said second boundary being configured to face said tracking surface, said first optic being arranged between the detector and the tracking surface during operation such that the tracking surface is spaced from the second boundary by a distance sufficient to inhibit any substantial retro-reflection of the substantially coherent light beam striking the second boundary from striking the detector;
 an second optic collecting at least a portion of the substantially coherent light beam scattered by the tracking surface, said second optic altering a wavefront profile of the collected scattered light beam so that the collected scattered light beam has a substantially constant phase relative to the plane of the detector, such that the detector detects a substantially stable speckle pattern from the collected scattered light beam.

23. The device as set forth in claim 22 wherein said tracking surface is human skin.

24. The device as set forth in claim 22 further comprising a controller responsive to the detector for utilizing the speckle pattern to track relative movement between the device and the tracking surface.

25. The device as set forth in claim 24 wherein said controller is responsive to the detector for suspending tracking of relative movement between the device and the tracking surface when the detector detects an off-surface condition.

26. The data input device as set forth in claim 22 further comprising a keyboard integral with the substantially coherent light source, the detector, and the optic.

27. The data input device as set forth in claim 22 wherein said optic is an uncoated optic.

28. The data input device as set forth in claim 22 wherein said substantially coherent light source projects an infrared substantially coherent light beam.

29. The data input device as set forth in claim 22 wherein said substantially coherent light source is at least one of a single mode Vertical Cavity Surface-Emitting Laser (VCSEL) and a multimode VCSEL.

30. The data input device as set forth in claim 22 wherein said substantially coherent light source projects a substantially coherent light beam having a substantially unitary polarization.

31. A method comprising:
 projecting a substantially coherent light beam from a data input device onto a tracking surface having light-scattering properties, said tracking surface scattering the substantially coherent light beam when the substantially coherent light beam strikes the tracking surface;

guiding the substantially coherent light beam toward the tracking surface with an optic having a first boundary facing said data input device, said optic further having a second boundary opposite the first boundary, said second boundary being configured to face said tracking surface;

spacing, by arranging the optic between a detector and the tracking surface during operation, the tracking surface from the second boundary by a distance sufficient to inhibit any substantial retro-reflection of the substantially coherent light beam striking the optic from striking the detector;

detecting out-of-phase substantially coherent light reflected from the tracking surface as a speckle pattern; and utilizing the detected speckle pattern to track relative movement between the device and the tracking surface.

32. The method as set forth in claim 31 further comprising determining if said data input device is spatially separated from said tracking surface by at least a lift-off detection distance as a function of the detected speckle pattern.

33. The method as set forth in claim 32 further comprising suspending tracking of relative movement between said data input device and said tracking surface when said data input device is spatially separated from said tracking surface by at least a lift-off detection distance.

34. A method comprising:

projecting a substantially coherent light beam from a data input device onto a tracking surface having light-scattering properties, said tracking surface scattering the substantially coherent light beam when the substantially coherent light beam strikes the tracking surface, an optic has a first boundary facing said data input device, wherein the optic further has a second boundary opposite the first boundary, wherein the second boundary is configured to face said tracking surface;

arranging the optic between a detector and the tracking surface during operation such that the tracking surface is spaced from the second boundary by a distance sufficient to inhibit any subtantial retro-reflection of the substantially coherent light beam striking the second boundary from striking the detector;

collecting at least a portion of the substantially coherent light beam scattered by the tracking surface;

altering a wavefront profile of the collected scattered light beam so that the collected scattered light beam has a substantially constant phase relative to a plane of a detector;

detecting a substantially stable speckle pattern from the collected scattered light beam; and utilizing the detected speckle pattern to track relative movement between the device and the tracking surface.

* * * * *